United States Patent
Seetharaman et al.

(10) Patent No.: US 11,784,870 B2
(45) Date of Patent: Oct. 10, 2023

(54) SYSTEM AND METHOD FOR EFFECTIVE DETERMINATION AND RESOLUTION OF NETWORK ISSUES IMPACTING APPLICATION PERFORMANCE IN MULTI-DOMAIN NETWORKS

(71) Applicant: Wipro Limited, Bangalore (IN)

(72) Inventors: Swaminathan Seetharaman, Chennai (IN); Ravi Kumar Emani, Bangalore (IN)

(73) Assignee: Wipro Limited, Karnataka (IN)

( * ) Notice: Subject to any disclaimer, the term of this patent is extended or adjusted under 35 U.S.C. 154(b) by 0 days.

(21) Appl. No.: 17/657,448

(22) Filed: Mar. 31, 2022

(65) Prior Publication Data

US 2023/0261932 A1 Aug. 17, 2023

(30) Foreign Application Priority Data

Feb. 15, 2022 (IN) .............................. 202241008029

(51) Int. Cl.
*H04L 41/0654* (2022.01)
*H04L 41/0631* (2022.01)
(52) U.S. Cl.
CPC ...... *H04L 41/0654* (2013.01); *H04L 41/0631* (2013.01)
(58) Field of Classification Search
CPC .................. H04L 41/0631; H04L 41/0654
(Continued)

(56) References Cited

U.S. PATENT DOCUMENTS

| 2010/0031090 A1* | 2/2010 | Bernardini | G06F 11/366 714/E11.002 |
| 2011/0168391 A1* | 7/2011 | Saleri | G06Q 10/06 166/250.15 |

(Continued)

OTHER PUBLICATIONS

Motodata Network Monitoring Software An AI-Driven Network Observability, pp. 1-7,—https://www.motadata.com/network-monitoring-tool/ (Year: 2023).*

(Continued)

*Primary Examiner* — David P Zarka
(74) *Attorney, Agent, or Firm* — Finnegan, Henderson, Farabow, Garrett & Dunner, LLP

(57) ABSTRACT

A method and system for determining and resolving network issues impacting application performance in multi-domain networks is disclosed. The method includes obtaining at least one of health and performance data associated with an application and one or more alerts related to fault and/or performance issues associated with the application. The method further includes determining at least one of network faults and performance issues that influence at least one of fault and/or performance issues associated with the application. The method further includes determining one or more underlying network problems that impact performance of the application. The method further includes determining at least one appropriate resolution action to address the one or more underlying network problems, implementing the at least one appropriate resolution action; monitoring an effectiveness of the implementation of the at least one appropriate resolution action; and adapting at least one of rules, parameters, and thresholds.

18 Claims, 9 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2020/0186411 A1* | 6/2020 | Ravichandran | H04L 41/5009 |
| 2020/0409780 A1* | 12/2020 | Balasubramanian | G06F 9/547 |
| 2021/0034454 A1* | 2/2021 | Spiro | G06F 3/04842 |
| 2021/0248024 A1* | 8/2021 | Poola | G06F 11/0772 |

OTHER PUBLICATIONS

Motodata Cloud monitoring Monitor Performance, and Availability of Cloud Infrastructure, pp. 1-4,—https:/www.motadata.com/solutions/cloud-monitoring/ (Year: 2023).*

Iizawa, Y. et al., "Multi-layer and multi-domain network orchestration by ODENS", Optical Fiber Communication Conference and Exhibition 2016, https://ieeexplore.ieee.org/document/7537283, pp. 1-3.

"Application aware network performance management", Manage Engine OpManager, 2022, 7 pages. https://www.manageengine.com/network-monitoring/application-aware-network-performance-management.html.

"Network Performance Monitoring and Telemetry| AppSensor", 2022, 9 pages. https://www.apcela.com/why-apcela/appsensor/.

Dräxler, S. et al., "5G OS: Control and Orchestration of Services on Multi-Domain Heterogeneous 5G Infrastructures," 2018 European Conference on Networks and Communications (EuCNC), 2018, pp. 1-9, doi: 10.1109/EuCNC.2018.8443210.

Rotsos, C. et al., "Network service orchestration standardization: A technology survey", Computer Standards and Interfaces 54 2017, pp. 203-215.

"Cisco Crosswork Network Automation", 2022, 9 pages. 4. https://www.cisco.com/c/en/us/products/cloud-systems-management/crosswork-network-automation/index.html#~product-family.

"Cisco Crosswork Change Automation and Health Insights Data Sheet", May 11, 2021, https://www.cisco.com/c/en/us/products/collateral/cloud-systems-management/crosswork-network-automation/datasheet-c78-742374.html.

"Ciena Blue Planet Fault Management Data Sheet: Fault Management", blueplanet 2022, 2 pages. https://media.ciena.com/documents/Blue_Planet_Fault_Management_DS.pdf.

"Ciena Blue Planet Performance Management Data Sheet: Performance Management", blueplanet 2022, 2 pages. https://media.ciena.com/documents/Blue_Planet_Performance_Management_DS.pdf.

"Infrastructure Intelligence Platform", Midarray Systems, 2019, 7pages. https://www.motadata.com/collaterals/iip-datasheet.pdf.

"Apcela's Appsensor: Network Telemetry and Monitoring Agent for Network and Application Performance", https://www.apcela.com/wp-content/uploads/2018/06/AppSensor-Data-Sheet_FINAL-10-7-18.pdf.

Application aware network performance management, ManageEngine OpManager, https://www.manageengine.com/network-monitoring/application-aware-network-performance-management.html.

Network Performance Monitoring and Telemetry | AppSensor—Real-time monitoring of network and application performance across hybrid and multi-cloud documents—AppSensor : Maximize the performance of your applications with end-to-end network visibility and performance monitoring across software-defined and cloud-based architectures https://www.apcela.com/why-apcela/appsensor/.

Dräxler, S. et al., "5G OS: Control and Orchestration of Services on Multi-Domain Heterogeneous 5G Infrastructures," 2018 European Conference on Networks and Communications (EuCNC): Network Softwarisation (NET) https://ieeexplore.ieee.org/document/8443210.

Rotsos, C. et al., "Network service orchestration standardization: A technology survey," Computer Standards & Interfaces 54 (2017) 203-215, https://www.sciencedirect.com/science/article/pii/S0920548916302458.

Cisco Crosswork Network Automation—Simplify services lifecycle management and operations—https://www.cisco.com/c/en/us/products/cloud-systems-management/crosswork-network-automation/index.html.

Cisco Crosswork Change Automation and Health Insights Data Sheet—https://www.cisco.com/c/en/us/products/collateral/cloud-systems-management/crosswork-network-automation/datasheet-c78-742374.html.

Blueplanet a division of Ciena—Data Sheet—Fault Management—Improve network availability and reduce operation costs—2 pages—https://media.ciena.com/documents/Blue_Planet_Fault_Management_DS.pdf.

Blueplanet a division of Ciena—Data Sheet—Proactively manage and ensure network and service performance—2 pages—https://media.ciena.com/documents/Blue_Planet_Performance_Management_DS.pdf.

Infrastructure Intelligence Platform—Make way for Uptime with Powerful Network Management Platform—IDC Notable Vendor, Network Monitoring—Info-Tech Research Group—7 pages—https://www.motadata.com/collaterals/iip-datasheet.pdf.

Apcela's Appsensor Data Sheet—Network Telemetry and Monitoring Agent for Network and Application Performance—3 pages—https://www.apcela.com/wp-content/uploads/2018/06/AppSensor-Data-Sheet_FINAL-10-7-18.pdf.

Iizawa, Y. et al., Multi-layer and Multi-domain Network Orchestration by ODENOS, OFC 2016 @ OSA 2016—3 pages—https://ieeexplore.ieee.org/abstract/document/7537283.

* cited by examiner

| Network Segment details 502 | Performance issue details 504 | Impacted application instance(s) 506 | Contribution Level (SEG-PERF-CONTRIB-APPL-PERF) 508 |
|---|---|---|---|
| SD-WAN segment id abc | Latency KPI non-compliance by alpha% | APP1, instance <mn> | X |
| | | APP1, instance <bc> | Y |
| SD-Access def | Throughout KPI non-compliance by beta% | APP1, instance <mn> | Z |
| | Throughout KPI non-compliance by gamma% | APP2, all instances | W |
| .... | | | |

| Network Service details 702 | Network Service Fault/Performance issue 704 | Application details 706 | Contribution Level (NTW-SERV-APPL-IMP-CONTRIB) 708 |
|---|---|---|---|
| NS1 | | APP1, APP2 | |
| NS2 | | APP1 | |
| NS3 | | APP4 | |
| .... | | | |

FIG. 7

| Network Service details 802 | Network Service Fault/Performance issue 804 | Application details 806 | Contribution Level (NTW-SERV-APPL-IMP-CONTRIB) 808 |
|---|---|---|---|
| NS1 | Perf KPI 1 violation by epsilon% | APP1 | X |
| | | APP2 | 0 |
| NS2 | Fault abc | APP1 | Y |
| NS3 | Perf KPI violation by omega% | APP4 | Z |
| .... | | | |

FIG. 8

| Cause(s) 902 | Resolution Action(s) 904 |
|---|---|
| Specific network path of a network service is not ok (KPI consistently below threshold or fault) | - Re- create network service by determining a new network path taking into account feasibility, policy, etc, |
| Traffic rate (predicted or actual) is exceeding provisioned limits for the network service | - Expand capacity of network service by allocating more resources (subject to policy and entitlement constraints) |
| Congestion in a port/link | - Determine alternative paths and re-route traffic<br><br>- Modify service configuration |
| Hardware failure in a data center | - Bring online additional HW<br><br>- Scale resources in same or different data center for the network service |
| Link failure (alarm) | - Re-route network service traffic on alternative path<br><br>- If auto-resolution is infeasible, mark link inactive and alert OSS |

FIG. 9

SYSTEM AND METHOD FOR EFFECTIVE DETERMINATION AND RESOLUTION OF NETWORK ISSUES IMPACTING APPLICATION PERFORMANCE IN MULTI-DOMAIN NETWORKS

TECHNICAL FIELD

This disclosure relates generally to communication networks, and more particularly to the method and system for effective determination and resolution of network issues impacting application performance in multi-domain networks.

BACKGROUND

In any enterprise arrangement, applications are hosted in a private data center, private cloud, or public cloud. In order to access the hosted application, enterprise users can use a wired connection available within their enterprise, i.e., Local Area Network (LAN), (LAN), private internet connection, i.e., broadband, or a wireless connection, i.e., Wi-Fi or $4^{th}$ generation or $5^{th}$ generation cellular network. Moreover, while using these applications from outside the enterprise, the enterprise users can directly access these applications over public internet connection with their respective authentication credentials or via a Virtual Private Network (VPN).

One of the biggest challenges for enterprises is determination of true cause of application fault and/or performance issues (i.e., degradation or availability) in a multi-domain environment that connects geographically scattered users with the applications. Such application fault and/or performance issues may be caused by problems in one or more network domains, environment of the application, or the application itself. Some existing systems are capable of monitoring fault and/or performance issues related to one or more network domains and to the environment of the application or the application itself, such as, network management system and application management system, respectively. However, none of the existing systems are capable of effectively identifying the application related fault and/or performance issues influenced by the network related fault and/or performance issues, and vice versa.

For example, in a multi-domain environment, an available Multi-Domain Orchestrator (MDO) may lack visibility into the application related fault and/or performance issues influenced by the network related fault and/or performance issues and/or lack visibility into access network issues, not have access to information such as user category and user location. Due to above listed reason, the existing systems may have following limitations, like, inadequate identification (partial or complete lack of identification within the required time window) of specific network fault and/or performance issues from multiple network segments that influences application fault and/or performance issues for example, impacting specific categories of users across certain locations; unable to implement an appropriate solution due to ineffective identification and visibility across the application and network environments. Therefore, the challenge for identification of cause of the fault and/or performance issue emerging due to multitude of related issues coming from the application environment and the network that impacts accessibility of the application by the users, remains constant.

Thus, there is a need for an improved MDO that can effectively identify and resolve application fault and/or performance issues influenced by specific network segment(s) fault and/or performance issues affecting users across locations and categories.

SUMMARY

In an embodiment, a method for determining and resolving network issues impacting application performance in multi-domain networks is disclosed. In one embodiment, the method may include obtaining at least one of health and performance data associated with an application and one or more alerts related to fault and/or performance issues associated with the application. The health and performance data may be analyzed to obtain insights into application performance. The method may further includes determining at least one of network faults and/or performance issues that influence at least one of fault and/or performance issues associated with the application. The method may further includes determining one or more underlying network problems that impact the performance of the application based on the at least one of the network faults and the performance issues. The method may further includes determining at least one appropriate resolution action to address the one or more underlying network problems. The method may further includes implementing the at least one appropriate resolution action to improve the application performance. The method further includes monitoring an effectiveness of the implementation of the at least one appropriate resolution action on the network segments, the network services and network services slices on improving the application performance, and impact of the resolution action on other network segments, network services, network slices and applications and taking appropriate preventive/corrective actions based on the monitoring. The method further includes adapting at least one of rules, parameters, and thresholds, based on an effectiveness factor determined for the at least one appropriate resolution action implemented.

In another embodiment, a system for determining and resolving network issues impacting application performance in multi-domain networks is disclosed. The system includes a processor and a memory communicatively coupled to the processor, wherein the memory stores processor executable instructions, which, on execution, causes the processor to obtain at least one of health and performance data associated with an application and one or more alerts related to fault and/or performance issues associated with the application. The health and performance data is analyzed to obtain insights into application performance. The processor executable instructions further cause the processor to determine at least one of network faults and/or performance issues that influence at least one of fault and/or performance issues associated with the application. The processor executable instructions further cause the processor to determine one or more underlying network problems that impact performance of the application based on the at least one of the network faults and performance issues. The processor executable instructions further cause the processor to determine at least one appropriate resolution action to address the one or more underlying network problems. The processor executable instructions further cause the processor to implement the at least one appropriate resolution action to improve the application performance. The processor executable instructions further cause the processor to monitor implementation of the at least one appropriate resolution action on the network segments, the network services and network services slices on improving the application performance, and impact of the resolution action on other network segments, network services, network slices and applications and taking appropriate preventive/corrective actions based on the monitoring. The processor executable instructions further cause the processor to adapt at least one of rules, parameters, and thresholds, based on an effectiveness factor determined for the at least one appropriate resolution action implemented.

In yet another embodiment, a non-transitory computer-readable medium storing computer-executable instruction for determining and resolving network issues impacting application performance in multi-domain networks is disclosed. The stored instructions, when executed by a processor, may cause the processor to perform operations including obtaining at least one of health and performance data associated with an application and one or more alerts related to fault and/or performance issues associated with the application. The health and performance data is analyzed to obtain insights into application performance. The operations further include determining, by the MDO, at least one of network faults and/or performance issues that influence at least one of fault and/or performance issues associated with the application. The operations further include determining one or more underlying network problems that impact performance of the application based on the at least one of the network faults and/or performance issues. The operations further include determining at least one appropriate resolution action to address the one or more underlying network problems. The operations further include implementing the at least one appropriate resolution action to improve the application performance. The operation may further include monitoring, by the MDO, an effectiveness of the implementation of the at least one appropriate resolution action on the network segments, the network services and network services slices on improving the application performance, and impact of the resolution action on other network segments, network services, network slices and applications and taking appropriate preventive/corrective actions based on the monitoring. The operations further include adapting at least one of rules, parameters, and thresholds, based on an effectiveness factor determined for the at least one appropriate resolution action implemented.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates a table depicting network segment performance contributing to application performance degradation, in accordance with an embodiment.

FIG. 7 illustrates a table depicting mapping of network services with an application, in accordance with an embodiment.

FIG. 8 illustrates a table depicting contribution of an impact of mapping of the network service and the application network service application impact, in accordance with an embodiment.

FIG. 9 illustrates a fault and/or performance issue and a resolution action provided for the fault and/or performance issue, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
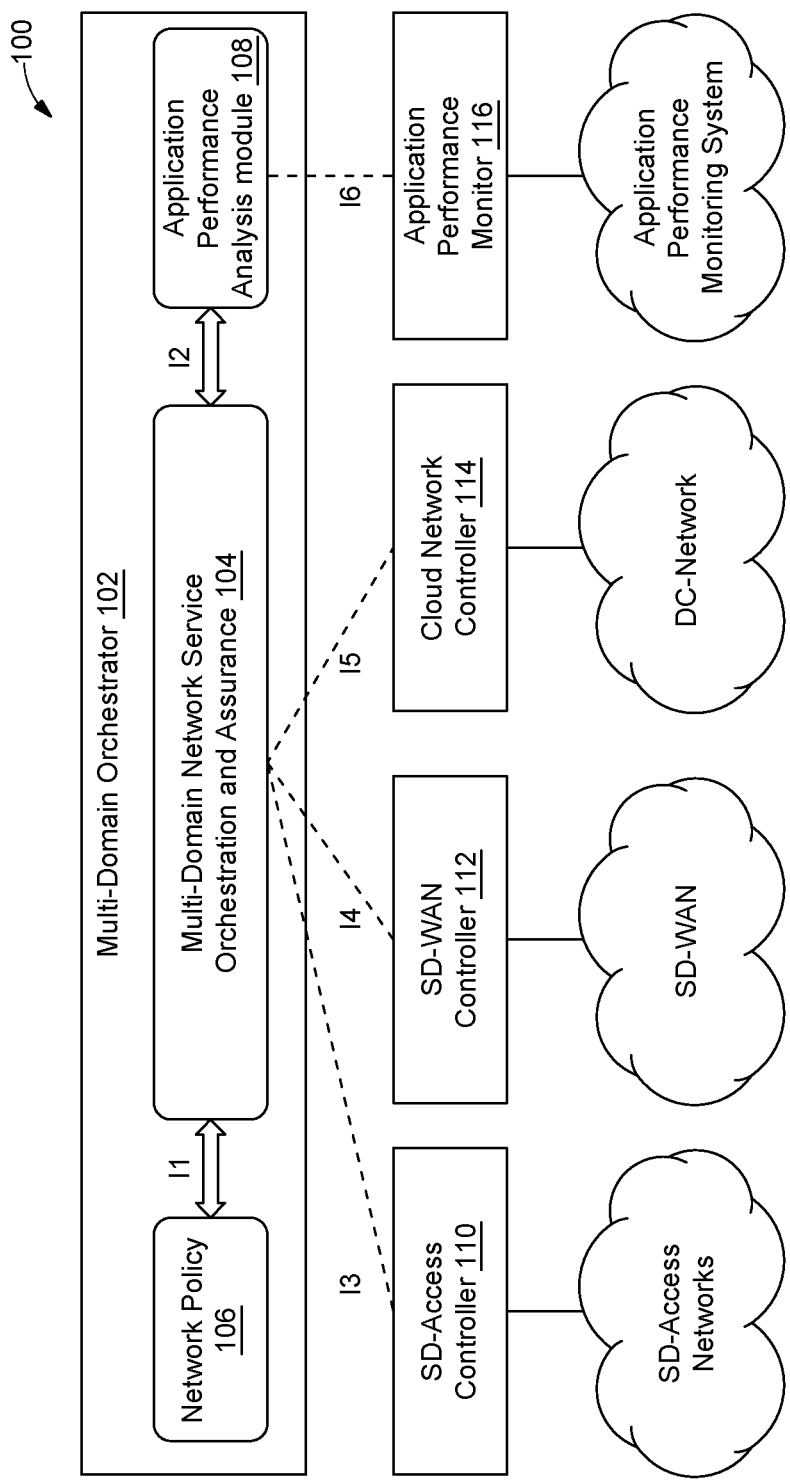
FIG. 1 illustrates a block diagram of a system for determining and resolving network issues impacting application performance in multi-domain networks, in accordance with an embodiment.

Referring now to FIG. 1, a block diagram of a multi-domain orchestration system 100 for determining and resolving network issues impacting application performance in multi-domain networks is illustrated, in accordance with an embodiment. The multi-domain orchestration system 100 displays an end-to-end network view that includes a multi-domain orchestrator (MDO) 102. The MDO 102 may include a multi-domain network service orchestration and assurance (MDNSOA) Sub-system 104. Initially, the MDN-SOA 104 may be configured to fetch the network policy from the Network Policy Module 106 set via an interface '11'. The network policy information fetched from the Network Policy Module 106 by the MDNSOA 104 may be provided to the MDO 102. Further, the MDNSOA 104 may connect with a Software-Defined (SD) access network controller 110 in order to provision, monitor, and collect fault and/or performance data of SD access networks from the SD-Access controller via an interface '13'. In addition, the MDNSOA 104 may connect with a SD-Wide Area Network (WAN) controller 112 via an interface '14' to provision, monitor, and collect fault and/or performance data of SD-WANs from the SD-WAN controller 112. Moreover, the MDNSOA 104 may connect with a cloud network controller 114 via an interface '15' to provision, monitor, and collect fault & performance data of a data center (DC) network from the cloud network controller 114.

Further, the MDNSOA 104 may fetch health and performance data associated with each application running on a cloud instance from an application performance analysis module 108 via an interface '12'. In an embodiment, the application performance analysis module 108 may connect with an application performance monitoring application 116 installed in an application performance monitoring system to provide heath and performance data via an interface '16'. Moreover, the MDNSOA 104 may receive continuous feed on Key Performance Indicators (KPIs) associated with each application running on the cloud instance from the application performance analysis module 108 via the interface '12'. Moreover, the KPIs received by the MDO 102 may be used to determine a network segment that that might be responsible for attributing performance degradation of an application. In an embodiment, the network segment attributing the performance degradation may be identified based on one or more thresholds defined for the KPIs associated with each application. Based on the predefined thresholds, when the KPIs data for the application is determined to be below the predefined threshold(s), then the MDO 102 may trigger correlation of application performance with network faults and performance to identify the network segment(s) responsible for performance degradation of the application. As will be appreciated the network policy module 106 and the application performance analysis module 108 may be either integrated with the MDNSOA 104 or may be separately present within the MDO 102 or may be even present outside the MDO 102.

Figure 2:
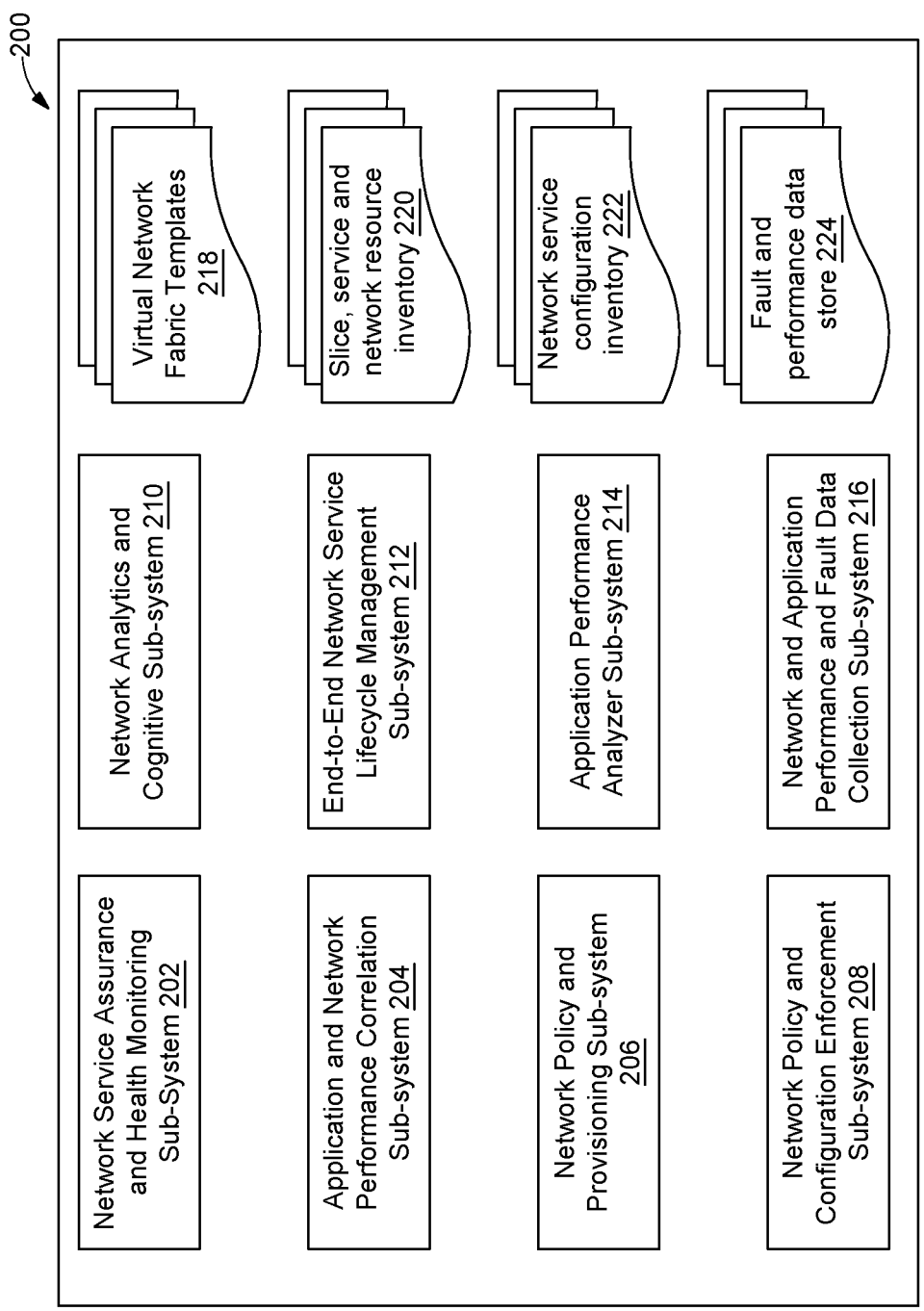
FIG. 2 illustrates a functional block diagram of various modules within a multi-domain orchestrator for determining and resolving network issues impacting application performance in multi-domain networks, in accordance with some embodiment.

Referring now to FIG. 2, a functional block diagram 200 of various modules within a multi-domain orchestrator configured for determining and resolving network issues impacting application performance in the multi-domain network is illustrated, in accordance with an embodiment. In reference to FIG. 1, the multi-domain orchestrator may correspond to the MDO 102. The MDO 102 includes a Network Service Assurance and Health Monitoring Sub-System (NET-SA-HM-SS) 202, an Application and Network Performance Correlation Sub-System (APP-NET-PERF-CORR-SS) 204, a Network Policy and Provisioning Sub-System (N-POL-PROV-SS) 206, a Network Policy and Configuration Enforcement Sub-System (N-POL-CONFIG-ENF-SS) 208, a Network Analytics and Cognitive Sub-System (NET-AN-COG-SS) 210, an End-to-End Network Service Life Cycle Management Sub-System (E2E-NS-LCM-SS) 212, an Application Performance Analyzer Sub-System (APP-PERF-ANALYSIS-SS) 214, a Network and Application Performance and Fault Data Collection Sub-System (NET-APP-PERF-FAULT-DATA-COLLECTION-SS) 216, Virtual Network Fabric Templates 218, Slice, Service, and Network Resource Inventory 220, Network Service Configuration Store 222, and Fault and Performance Data Store 224.

The NET-SA-HM-SS 202 may be responsible for assurance of service and overall health of network. Moreover, the NET-SA-HM-SS 202 may take necessary steps in order to recover from faults or to prevent (predicted) faults from occurring in any of the network segments or network services associated with the network. In an embodiment, the faults may be predicted via NET-AN-COG-SS 210, which is explained in detailed below. Further, the NET-SA-HM-SS 202 may also be used to monitor overall performance of the network as a whole. In addition, the NET-SA-HM-SS 202 may assist network slice orchestrator in making suitable decisions during service creation and scaling of the network services.

The APP-NET-PERF-CORR-SS 204 may be responsible for determining correlation of application and network fault and/or performance data and identify network sub-system(s) and/or network service(s) that are contributing to a deteriorating application performance experience of users. The APP-NET-PERF-CORR-SS 204 may then initiate necessary and appropriate actions to address the fault and/or performance issues in the application taking into consideration an impact of such actions on other network services, network segments, and applications. Further, the APP-NET-PERF-CORR-SS 204 may initiate necessary resolution actions to address adverse impacts on other network services, network segments, and applications due to implementing a resolution action to fix the fault and/or performance issues associated with the network that has resulted in fault and/or performance issues with a specific application (or one or more instances of the application). Moreover, the APP-NET-PERF-CORR-SS 204 may predict performance of the application based on the fault and/or performance issues predicted for the network. Additionally, the APP-NET-PERF-CORR-SS 204 may provide inputs to E2E-NS-LCM-SS 212 to change network configuration so as to keep up service level Key Performance Indicators (KPIs) of the network above the predefined thresholds. Further, the APP-NET-PERF-CORR-SS 204 may interact with the NET-AN-COG-SS 210 for relevant inputs for analysis, correlation, and determination of appropriate preventive/corrective actions. The APP-NET-PERF-CORR-SS 204 may also interact with the APP-PERF-ANALYSIS-SS 214 for obtaining application performance analysis data. In addition, the APP-NET-PERF-CORR-SS 204 may interact with the NET-SA-HM-SS 202 for necessary resolution actions to assure the service level KPIs of the network. The APP-NET-PERF-CORR-SS 204 may interact with the NET-APP-PERF-FAULT-DATA-COLLECTION-SS 216 for making updates in monitoring and collection of the fault and/or performance data associated with the network from network functions. The updates to the monitoring and collection of fault and/or performance data may include, for example, granularity and periodicity of data collection, what data to collect, and so on.

The N-POL-PROV-SS 206 may be responsible for receiving all operator-provisioned inputs and configuration policies and then send the relevant operator-provisioned inputs and configuration policies to relevant sub-systems present in the multi-domain orchestrator 102. In addition to its existing functions, the N-POL-PROV-SS 206 may be configured to receive network, user, and application-centric policy inputs. Further, the N-POL-PROV-SS 206 may translate the policy inputs into policy configuration rules for different network sub-systems of the multi-domain orchestrator 102. In reference to FIG. 1, the N-POL-PROV-SS 206 may share this information, i.e., the policy configuration rules with respective domain controllers of the SD-Access Networks, the SD-WAN, and SD-DC Networking systems (also referred as the DC Networks). The N-POL-PROV-SS 206 may receive operator inputs for monitoring network sub-systems and rules for taking automatic preventive and corrective actions. In addition, the N-POL-PROV-SS 206 may receive inputs from the operator for creating a new network service (SRV-RQST). The SRV-RQST may contain following fields, such as, service type (SRV-TYPE), maximum number of users (MAX-USERS), performance requirements (TARGET-SLA-KPI), dimensions which may include capacity (CAP) and user density (USER-DEN), isolation and resource sharing levels (ISO-SHARING), and security, policy requirements/constraints (SEC-POL-RQMTS). The N-POL-PROV-SS 206 may receive inputs on rules and thresholds to be used for correlating the fault and/or performance issues associated with the application and the network, determining root causes for the fault and/or performance issues, and so on.

The N-POL-CONFIG-ENF-SS 208 may be responsible for enforcement of network policies and service configurations. Further, the N-POL-CONFIG-ENF-SS 208 may invoke respective domain controller application programming interfaces (APIs) to enforce the network policies and service configurations in respective sub-network domains. In addition, the N-POL-CONFIG-ENF-SS 208 may interact with the E2E-NS-LCM-SS 212 and the N-POL-PROV-SS 206 for instructions. Further, the N-POL-CONFIG-ENF-SS 208 may connect with sub-network domain controller-related drives to interface with respective domain controllers.

The NET-AN-COG-SS 210 may be responsible for performing analytics and/or execution of machine learning algorithms as instructed by the E2E-NS-LCM-SS 212, NET-SA-HM-SS 202, and APP-NET-PERF-CORR-SS 204. Further, the NET-AN-COG-SS 210 may predict the service level KPIs of the network, network resource utilization, network congestion, user & application-centric network performance. Additionally, the NET-AN-COG-SS 210 may interact with the NET-APP-PERF-FAULT-DATA-COLLECTION-SS 216, and the NET-SA-HM-SS 202. In addition to its existing functions, the NET-AN-COG-SS 210 may determine the impact of a resolution action on other network segments, network services, and applications based on historical data using well-known analytics and machine learning algorithms. The NET-AN-COG-SS 210 may determine the correlation between the network segment(s) or the network service(s) performance degradation with that of the application's (or specific instances of the application) performance degradation. The NET-AN-COG-SS 210 may perform a temporal correlation and then adjusts the temporal correlation based on overlap of location of the network segment or the network service and the location of users accessing the application who are experiencing performance degradation in the application. The NET-AN-COG-SS 210 may determine contribution of the network segment's fault on the performance of the application performance. Moreover, the NET-AN-COG-SS 210 may also determine underlying cause of the fault and/or performance issues of the network segment or the network service's using existing machine learning techniques, and proprietary methods including rule-based machine learning, and analytics-based approaches. In addition, the NET-AN-COG-SS 210 may determine the impact of the resolution action on other network segments and network services. The impact may be determined by examining historical fault and/or performance data and determining fault or performance degradation that may have occurred due to the resolution action, by eliminating non-relevant factors and using machine learning techniques such as reinforcement learning.

The E2E-NS-LCM-SS 212 may be responsible for orchestration of the network service lifecycle including instantiation, scaling, healing, modification, and finally termination of the network service. In addition to its existing functions, the E2E-NS-LCM-SS 212 may interact with network configuration datastore, virtual fabrics, and network resource repositories. Further, the E2E-NS-LCM-SS 212 may instruct the N-POL-CONFIG-ENF-SS 208 to deploy the configuration by invoking respective domain controller functions. In addition, the E2E-NS-LCM-SS 212 may also interact with the NET-SA-HM-SS 202 and the NET-AN-COG-SS 210, and update the slice, service, and network resource inventory 220.

The APP-PERF-ANALYSIS-SS 214 may be responsible for analysis of application performance data received from an application management sub-system (AMS). The APP-PERF-ANALYSIS-SS 214 may generate insights like application performance levels against expected levels. In addition, the APP-PERF-ANALYSIS-SS 214 may interact with the NET-APP-PERF-FAULT-DATA-COLLECTION-SS 216 in order to collect batch or stream of performance data associated with the network and the application. Further, the NET-APP-PERF-FAULT-DATA-COLLECTION-SS 216 may provide transformed application performance data to the APP-NET-PERF-CORR-SS 204.

The NET-APP-PERF-FAULT-DATA-COLLECTION-SS 216 may be configured to collect the fault and/or performance data associated with the network from various network segments. In addition, the NET-APP-PERF-FAULT-DATA-COLLECTION-SS 216 may collect data associated with the application, such as, the fault and/or performance data of the application, details of the users accessing the application, etc. In an embodiment, the NET-APP-PERF-FAULT-DATA-COLLECTION-SS 216 may receive the fault and/or performance data related to the network from network functions. In addition, the NET-APP-PERF-FAULT-DATA-COLLECTION-SS 216 may receive the fault and/or performance data associated with the application from the AMS. Further, the NET-APP-PERF-FAULT-DATA-COLLECTION-SS 216 may perform necessary aggregation and segregation of the fault and/or performance data received from the various network functions at network function level, network function type level, network service level or at any granularity as specified by the E2E-NS-LCM-SS 212, the NET-AN-COG-SS 210, the NET-SA-HM-SS 202, and the APP-NET-PERF-CORR-SS 204. In addition, the NET-APP-PERF-FAULT-DATA-COLLECTION-SS 216 may receive and store the fault and/or performance data associated with the network and the application in the fault and performance data store 224.

The virtual network fabric templates 218 may contain details of virtual network fabric, network fabric instance, services, and network resources allocated to a fabric. In addition, the virtual network fabric template 218 may contain details of network element configurations for each sub-system available in the MDO 102, for a given network fabric.

The slice, service, and network resource inventory 220 may contain details of network resource inventory and topology of physical networks of the SD-Access Network, the SD-WAN, and the DC network. Further, the slice, service, and network resource inventory 220 may contain network service inventory and details of network slices that are available for hosting the network services.

The network service configuration store 222 may carry configuration data for different types of services that can be configured. Further, the network service configuration store 222 may carry network configuration for each of network service templates added to the Slice, Service, and Network Resource Inventory 220. In addition, the network service configuration store 222 may also contain details of the thresholds, the parameter values, and the rules that are used by various components of the MDO 102.

Figure 3:
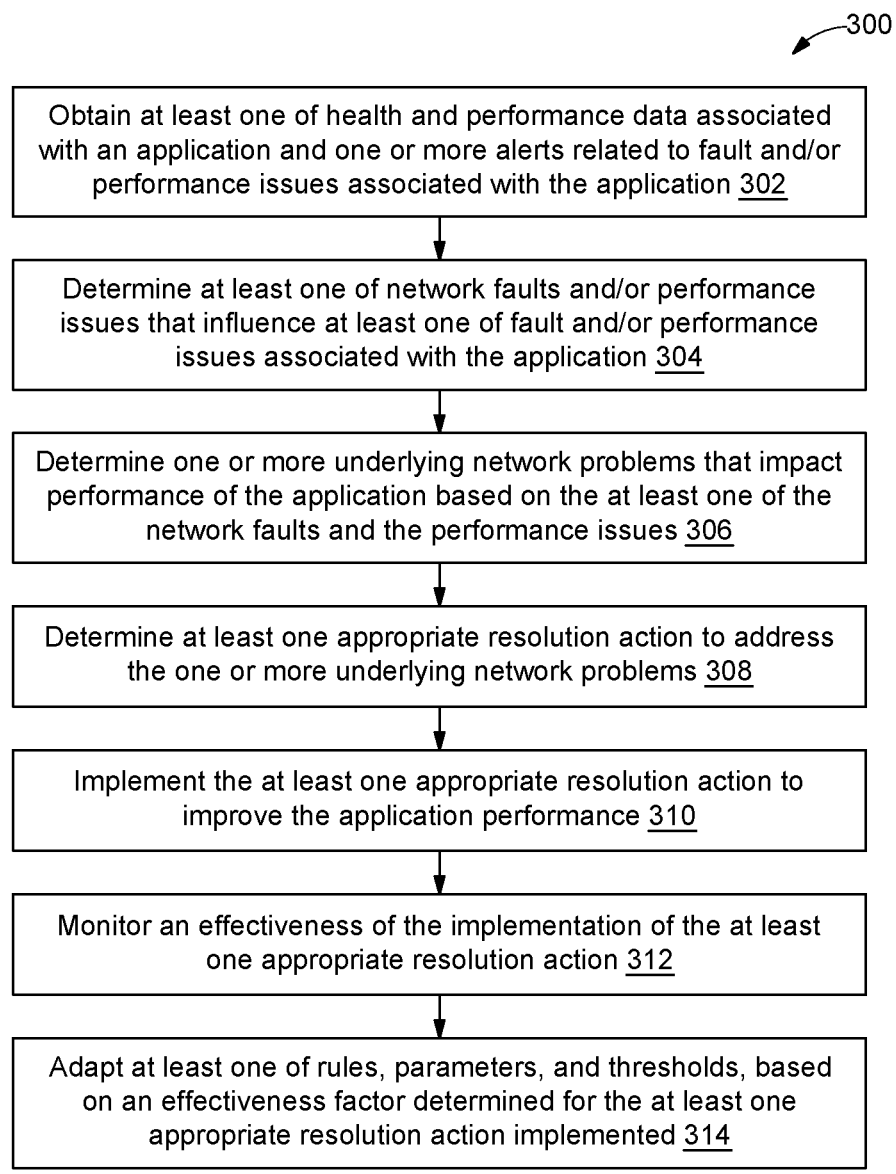
FIG. 3 illustrates a flowchart of a method for determining and resolving network issues impacting application performance in multi-domain networks, in accordance with the embodiment.

The fault and performance data store 224 may contain historical fault and/or performance data as reported from the network functions and the AMS. The NET-APP-PERF-FAULT-DATA-COLLECTION-SS 216 may store all received data (i.e., the fault and/or performance data associated with the network and the application) in the fault and performance data store 224. The period of retention of historical data is typically provisioned by the operator. Referring now to FIG. 3, a flowchart of a method for determining and resolving network issues impacting application performance in multi-domain networks is illustrated, in accordance with the embodiment. At step 302, at least one of the health and performance data associated with an application may be obtained. In addition, one or more alerts related to fault and/or performance issues associated with the application may be obtained. In an embodiment, the health and performance data may be analyzed to obtained to obtain insights of application performance. The health and performance data may include determination of at least one of interaction latencies between an application-level client and a server, response time from a server-side application instance to a client, the application performance across deployed application instances, and Central Processing Unit (CPU) utilization levels and number of concurrent sessions data for each of the deployed application instances. In addition, the one or more alerts may include information related to the application instances, a time window associated with the application, and location information associated with application client. Moreover, the one or more alerts related to the fault and/or performance issues may be proactively or reactively generated. In order to analyze the health and performance data to obtain insights of the application performance a count of the application instances experiencing performance degradation may be determined. Once the count of the application instance is determined, consistency of the performance degradation may be determined for each of the count of the application instances. Further, at step 304, at least one of network faults and performance issues may be determined. The at least one the network fault and/or performance issues may correspond to the fault and/or performance issues of the network that may influence at least one of the fault and/or performance issues associated with the application may be determined. In an embodiment, the fault and/or performance issues associated with the application may be determined to identify the performance of the application. At step 306, one or more underlying network problems that impact the performance of the application may be determined based on at least one of the network faults and the performance issues. Examples of the one or more underlying problems may include, but is not limited to, hardware issue, software issues, configuration issues, such as, creation, deletion, and modification of the network services and the network slices and change in network load and security exceptions. Further, the one or more underlying problems determined may be analyzed. In an embodiment, each of the one or more underlying problems may be analyzed to determine network domains and network segments associated with an affected application instance, correlation of the underlying network faults and the faults and performance issues associated with the affected application instance, and network domains and network services attributing to performance degradation of the affected application instance.

Once the one or more underlying problems are determined, at step 308, at least one appropriate resolution action may be determined to address the one or more underlying network problems. In order to determine the at least one resolution action, initially, one or more resolution actions may be selected for each of the one or more underlying network problems. In an embodiment, one or more resolution actions includes at least one of a resolution action for each of a corresponding network problem. Once the one or more resolution actions are selected, each of the one or more resolution actions may be analyzed to select the at least one appropriate resolution action. In an embodiment, the at least one appropriate resolution action may be selected based on a determined positive impact of the at least one appropriate resolution action on network segments, network slices, and network applications of other networks. Moreover, in order to select the at least one appropriate resolution action an execution feasibility of the one or more resolution actions may be examined based on a predefined policy, user entitlements, service entitlements and application entitlements. Further, an impact of the one or more resolution action may be accessed, on the application performance, the network services, the network slices, and the network segments. Upon accessing the impact, a feasibility and complexity score may be assigned to the one or more resolution actions, based on the assessed impact of the one or more resolution actions. Based on the feasibility and complexity score assigned, each of the one or more resolution actions may be ranked and arranged in an ascending order. Further, based on ranking of each of the one or more resolution actions, the one or more resolution actions having the feasibility and complexity score greater than a predefined threshold score may be discarded. Moreover, in order to select the one or more resolution action, the one or more resolution actions determined for improving the application performance may be evaluated based on one or more of an effectiveness parameter, an impact parameter, and a stability parameter. In addition, the one or more resolution actions may be determined based on an effectiveness of each of the one or more resolution actions to address the one or more underlying network problems, based on historical data and adapted rules.

Upon determining the at least one appropriate resolution action, at step 310, the at least one appropriate resolution action may be implemented to improve the application performance. In an embodiment, the at least one appropriate resolution action may be implemented on one or more network segments, network services and network slices. At step 312, an effectiveness of the implementation of the at least one appropriate resolution action on the network segments, the network services and network services slices on improving the application performance may be monitored. Further, an impact of the resolution action on other network segments, network services, network slices and applications may be monitored in order to take appropriate preventive/corrective actions. In other words, the at least one appropriate resolution action implemented on the network segments, the network services, the network services slices, and the impact on the other network segment, the network services, the network slices and applications may be monitored and appropriate preventive/corrective actions may be further taken to ensure effectiveness in improving the application performance and to address impacts on other network segments, network services, network slices and other applications. Further, at step 314, at least one of rules, parameters, and thresholds may be adapted, based on an effectiveness factor determined for the at least one appropriate resolution action implemented. In order to adapt the at least one of rules, parameters, and thresholds, effectiveness of the at least one appropriate resolution action may be assessed. In an embodiment, in order to assess the effectiveness, new impacts may be determined that may have arisen due to implementation of the at least one appropriate resolution action and stability of the at least one appropriate resolution action. Further, based on the assessed effectiveness, the effectiveness factor may be determined for the at least one appropriate resolution factor.

Figure 4:
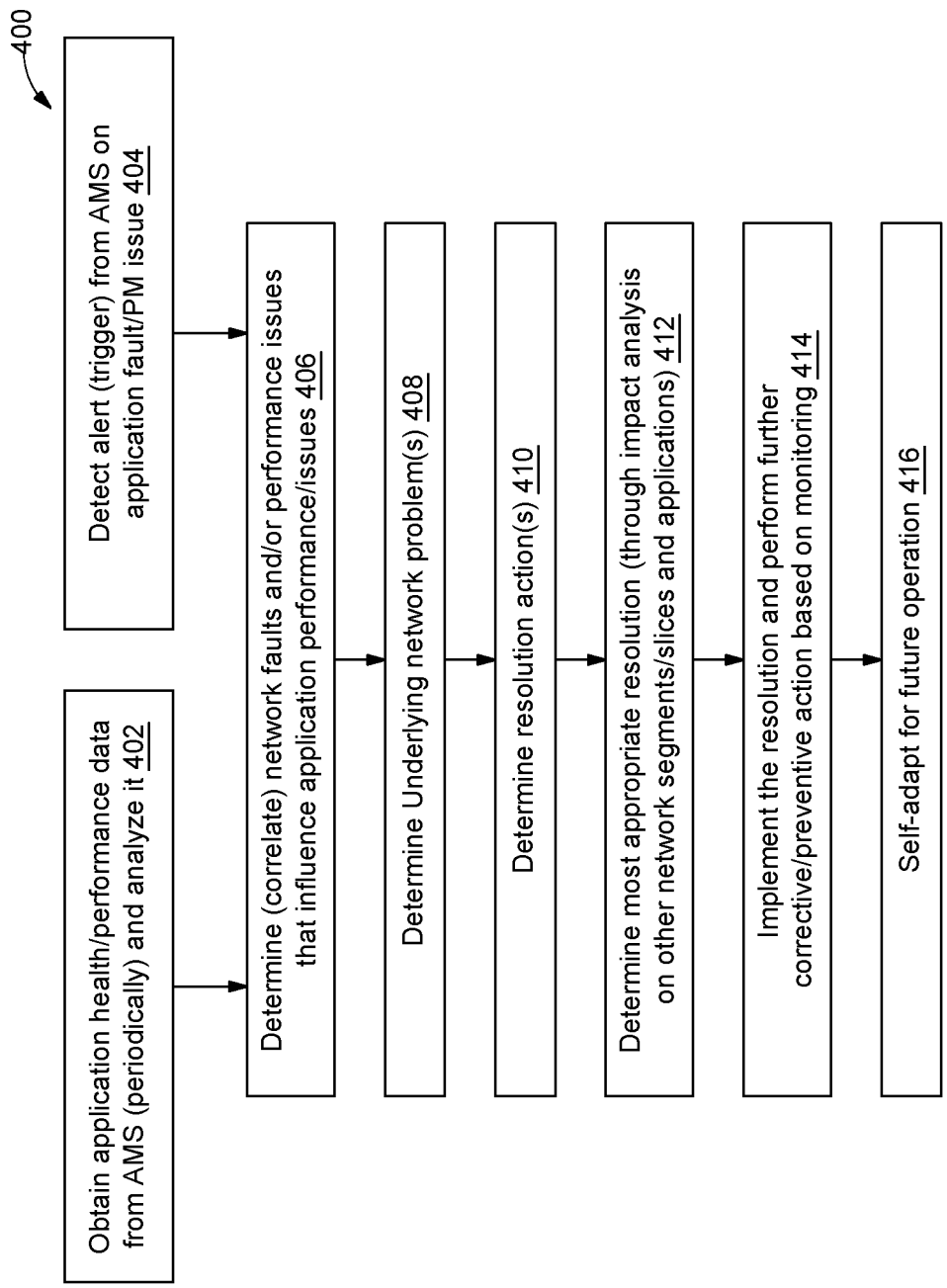
FIG. 4 illustrates a detailed flowchart of a method for determining and resolving network issues impacting application performance in multi-domain networks, in accordance with an embodiment.

Referring now to FIG. 4, a detailed flowchart of a method 400 for determining and resolving network issues impacting an application is illustrated, in accordance with the embodiment. At step 402, application health and performance data may be obtained from the AMS (periodically) and analyzed.

In reference to FIG. 2, the NET-APP-PERF-FAULT-DATA-COLLECTION-SS 216 in the MDO 102 may periodically receive the heath and performance data from the AMS. In an embodiment, the heath and performance data associated with the application may constitute application-level client-server interaction latencies, and response times from server-side application instance to client. Moreover, the health and performance data received may provide insights into the performance of the application across deployed instances, CPU utilization levels, and number of concurrent sessions of data for each of the deployed application instances. Further, the NET-APP-PERF-FAULT-DATA-COLLECTION-SS 216 may validate the received heath and performance data and pass the validated heath and performance data to the APP-PERF-ANALYSIS-SS 214 for analysis. Moreover, the NET-APP-PERF-FAULT-DATA-COLLECTION-SS 216 may also store the heath and performance data in a data lake (for example in the fault and performance data store 224) and trigger the APP-PERF-ANALYSIS-SS 214 for analyzing the health and performance data. The APP-PERF-ANALYSIS-SS 214 may analyze the health and performance data of the application for specified duration to determine if there was any application performance degradation and corresponding application server instances, application clients' locations, and time periods during which application response times or client-server interaction latencies exceeded the threshold score derived from the application and user service KPIs. Furthermore, the APP-PERF-ANALYSIS-SS 214 may activate the NET-AN-COG-SS 210 to forecast any potential fault and/or performance issue associated with the application. In addition, other characteristics may also be determined, such as CPU utilization levels of the application instance, momentary spikes in traffic, and number and location of users experiencing the performance degradation.

In an embodiment, the APP-PERF-ANALYSIS-SS 214 may compare the health and performance data with historical fault and/or performance data of the application. As will be appreciated, the historical fault and/or performance data and details of past analysis of the historical fault and/or performance data may be received from the AMS and stored in a database. This may be done to eliminate any intermittent blips in the health and performance data and prematurely react to ephemeral fault and/or performance issues which could impact stability of the application and the network in general. Further, the APP-PERF-ANALYSIS-SS 214 may determine a set of application types of the application instances that are having performance degradations or faults and compose application fault and performance degradation list (APP-FAULT-PERF-DEGRADATION-LIST). The APP-FAULT-PERF-DEGRADATION-LIST may include details such as, application type, application instance identification (ID), user groups, (if there are any specific users experiencing the application performance degradation), and user location (if there are any specific locations where user experience the application performance degradation). Furthermore, the APP-PERF-ANALYSIS-SS 214 may then trigger the APP-NET-PERF-CORR-SS 204 to initiate the analysis and correlation process in order to determine whether there are any fault and/or performance issues in the network that attributes to the application performance degradation or (predicted) fault.

At step 404, the NET-APP-PERF-FAULT-DATA-COLLECTION-SS 216 may receive an alert from the AMS about a fault and/or performance issue associated with the application. In an embodiment, the alert may either be proactive (i.e., based on prediction of the fault and/or performance issue) or reactive (i.e., after the fault and/or performance issue has actually occurred). The alert may contain relevant details of the application including the application instance, time window, and application clients' locations, etc. The NET-APP-PERF-FAULT-DATA-COLLECTION-SS 216 may then trigger the APP-PERF-ANALYSIS-SS 214 to determine or obtain details such as, set of application types and application instances that are having the performance degradation or faults, from the AMS. Based on the obtained details, the NET-APP-PERF-FAULT-DATA-COLLECTION-SS 216 may compose the APP-FAULT-PERF-DEGRADATION-LIST. The APP-FAULT-PERF-DEGRADATION-LIST captured may include application type, application instance ID(s), user groups (if there is any specific user that experience the performance degradation), and user location (if there are any specific locations experiencing the performance degradation). The APP-PERF-ANALYSIS-SS 214 may then trigger the APP-NET-PERF-CORR-SS 204 to initiate the analysis and correlation process in order to determine whether there are any fault and/or performance issues in the network that attributes to the application performance degradation or (predicted) fault.

At step 406, the fault and/or performance issue associated with the network that influence the fault and/or performance issue associated with the application may be determined (correlated). In addition, the network domains and the network segments associated with the impacted application instance(s) may be determined. In an embodiment, the APP-NET-PERF-CORR-SS 204 may determine the network domains and the network segments associated with the impacted application(s) instance(s) in the SD-Access Network, the SD-WAN, the DC network, and Cloud Network domains based on the APP-FAULT-PERF-DEGRADATION-LIST. In addition, the APP-NET-PERF-CORR-SS 204 may determine the network domains and the network segments associated with the impacted application instance(s) by obtaining relevant inputs from the E2E-NS-LCM-SS 212 on the network segments that are catering to the network service(s) on which the impacted application instance(s) are running.

In an embodiment, in order to determine the network domains and the network segments, cloud network paths associated with the application instance(s) may be determined. In order to determine the cloud network paths associated with the application instance(s), the APP-NET-PERF-CORR-SS 204 may analyze cloud network topology, traffic associated with network services, and the applications served by the network services. Further, the APP-NET-PERF-CORR-SS 204 may compose cloud network nodes and paths list (also referred as CLOUD-NETWORK-SEGMENT-LIST) associated with APP-FAULT-PERF-DEGRADATION-LIST traffic paths. The APP-NET-PERF-CORR-SS 204 may then determine the SD-WAN network Paths associated with the application instance(s). In order to determine the SD-WAN network paths, the APP-NET-PERF-CORR-SS 204 may determine SD-WAN network segments or network service paths associated with the application by analyzing SD-WAN network topology and application traffic associations. The APP-NET-PERF-CORR-SS 204 may then compose list of network paths (also referred as SD-WAN-NETWORK-SEGMENT-LIST) used by network services mapped to the applications in the APP-FAULT-PERF-DEGRADATION-LIST. Further, the APP-NET-PERF-CORR-SS 204 may determine SD-Access network Paths associated with application instance(s). In order to determine, the SD-Access network paths, the APP-NET-PERF-CORR-SS may determine SD-Access networks associated with user groups or user locations of the APP-FAULT-PERF-DEGRADATION-LIST. Further, the APP-NET-PERF-CORR-SS 204 may determine network segments associated with the application traffic by analyzing the SD-Access network topology and application traffic associations. Thereafter, the APP-NET-PERF-CORR-SS 204 may compose the network segment list (SD-ACCESS-NETWORK-SEGMENT-LIST) for each of the SD-Access networks associated with the applications in the APP-FAULT PERF-DEGRADATION-LIST. As appreciated by those skilled in the art, link between the network segment and the application(s) that it serves is specified in the CLOUD-NETWORK-SEGMENT-LIST, the SD-WAN-NETWORK-SEGMENT-LIST, and the SD-ACCESS-NETWORK-SEGMENT-LIST.

In an embodiment, correlation of the network faults and performance data with the performance of the application is disclosed. The APP-NET-PERF-CORR-SS 204 may query the NET-SA-HM-SS 202 for any of the fault or performance issues (predicted as well as detected) in the network service(s) serving the application instance(s) in the APP-FAULT-PERF-DEGRADATION-LIST and forms the list of network services having an impact (NTW-SERV-IMP-LIST). The APP-NET-PERF-CORR-SS 204 may also query the NET-SA-HM-SS 202 for any of the fault and/or performance issues (predicted as well as detected) associated with the SD-ACCESS-NETWORK-SEGMENT-LIST, the SD-WAN-NETWORK-SEGMENT-LIST, and the CLOUD-NETWORK-SEGMENT-LIST. Upon determining any of fault the performance issues in the network service(s) on which the application instance(s) present in the APP-FAULT-PERF-DEGRADATION-LIST is running and/or any fault and/or performance issues in one or more of the SD-ACCESS-NETWORK-SEGMENT-LIST, the SD-WAN-NETWORK-SEGMENT-LIST, and the CLOUD-NETWORK-SEGMENT-LIST, the APP-NET-PERF-CORR-SS may perform a check to identify whether time window of that fault and/or performance issue has a direct relation with time window during which the fault and/or performance issue were predicted or detected for the application instance(s).

By the way of an example, in case of a fault in SD-Access (e.g., connectivity loss, outage), the application instance(s) using the SD-Access facing the fault and/or performance issue may experience performance degradation or outage within a few seconds after the fault in SD-ACCESS. In the case of performance degradation (e.g., congestion) in the SD-WAN, the application instance(s) may gradually experience the performance degradation sometime after the fault and/or performance issue have occurred in the SD-WAN. In an embodiment, upon finding a relation, the APP-NET-PERF-CORR-SS 204 may trigger the NET-AN-COG-SS 210 to determine an impact of network problem(s) (identified as described in above example) on the application fault or performance issues for the application instance(s) in the APP-FAULT-PERF-DEGRADATION-LIST.

In order to determine the impact, the APP-NET-PERF-CORR-SS 204 may pass relevant details of the impacted application instance(s), i.e., the APP-FAULT-PERF-DEGRADATION-LIST, and the SD-ACCESS-NETWORK-SEGMENT-LIST, the SD-WAN-NETWORK-SEGMENT-LIST, the CLOUD-NETWORK-SEGMENT-LIST, and the NTW-SERV-IMP-LIST to NET-AN-COG-SS 210. Further, upon receiving a trigger from the APP-NET-PERF-CORR-SS 204 as described in the above example, the NET-AN-COG-SS 210 may analyze overall network health and performance data of each of the network segments. In order to analyze the overall health and performance data of the network, the NET-AN-COG-SS 210 may assess the network service KPIs and Quality of Services (QoS) values for stated time period for each network segment and find correlation with the application fault and/or performance issue.

Initially, the NET-AN-COG-SS 210 may check traffic patterns and performance data to determine if the traffic pattern associated with the applications is experiencing degradation in the network segment. Based on the check performed, when the traffic patterns are consistently abnormal (i.e., beyond provisioned thresholds NET-SEG-PERF-THRES) then, NET-AN-COG-SS 210 may determine if there are any deviations in meeting the Quality of Service (QoS) and Service Level Agreements (SLAs) of the network services that are associated with application traffic. This may then also be correlated with the NTW-SERV-IMP-LIST to ensure consistency. Upon determining the performance of the network segment to be beyond a network segment performance threshold, i.e., NET-SEG-PERF-THRES, the NET-AN-COG-SS 210 may determine the potential contribution of the performance degradation in that particular network segment on the application performance. In an embodiment, the potential contribution of the performance degradation in that particular network segment on the application performance may be determined by computing degree of correlation based on existing techniques such as, least squares, Pearson's correlation coefficient, maximal information coefficient, etc. or using other complex and proprietary techniques.

Further, the network segment performance contribution on the application network, i.e., NET-SEG-PERF-CONTRIB-APPL-PERF may be adjusted based on number of the application instance(s) served by the network segment facing the performance degradation, as well as the location of users that were impacted while accessing the application. By way of an example, when users spread across multiple locations were impacted, then most likely a core network performance issue may have contributed to the performance degradation of the application performance. Whereas, when users from one specific area faces the performance degradation, then most likely a specific access network or connectivity to core network may have contributed to the performance degradation of the application performance).

Moreover, the NET-SEG-PERF-CONTRIB-APPL-PERF may also be adjusted based on an adjustment factor, i.e., ADJ-FACTOR. The ADJ-FACTOR may be determined during self-learning process, which is further explained in detail in conjunction with Step 416 (initially the ADJ-FACTOR is 1). By way of an example, the ADJ-FACTOR may be initialized to 1 before the self-learning process. In an embodiment, the NET-SEG-PERF-CONTRIB-APPL-PERF determined may be periodically recorded as depicted via table 500 of FIG. 5. In table 500, a first column, i.e., network segment details 502 may depict details of each of the network segments responsible for the performance degradation of the application. A second column, i.e., performance issue details 504 may contain details of the performance degradation detected. A third column, i.e., impacted application instance(s) 506 may provide details of the application instance(s) that may be impacted by the performance degradation/issue in the specified network segment under consideration. A fourth column, i.e., contribution level 508 may depict contribution of the specific network segment to the performance degradation on that particular application instance(s). In an embodiment, even when the performance of each of the network segments is within provisioned thresholds, a temporal correlation of momentary spikes in performance and short-lived faults (if any) in the network segment on the application performance may be performed. Additionally, when the correlation is above the provisioned threshold, then the NET-SEG-PERF-CONTRIB-APPL-PERF may be adjusted using a suitable factor, say, temporal impact factor, i.e., TEM POR-IM P-FACTOR.

Further, any faults (also referred as anomalies) associated with the network segments may be identified. Then, potential contribution of the identified faults may be determined on performance degradation and/or outage of the application. In an embodiment, the potential contribution of the faults may be determined using pre-provisioned factors, a temporal relation between the network segment fault and the application performance degradation, an availability of alternative resources for the application, and so on, as depicted via an equation 1 below.

$$\text{NET-SEG-FAULT-CONTRIB-APPL-ISSUE}=\{(\text{FLT-FACTOR}*\text{TEMP-REL})+\text{ALT-FACTOR}+\text{LOC-FACTOR}\}*\text{ADJ-FACTOR} \quad (1)$$

In the equation (1) above, the NET-SEG-FAULT-CONTRIB-APPL-ISSUE may correspond to the level that a network segment fault contributes to the application performance degradation. The FLT-FACTOR may correspond to a provisioned fault factor (e.g., that may be between 0.1 and 1). The TEMP-REL may correspond to the temporal relation. By way of example, the temporal relation may be between 0.1 and 1. In an embodiment, when there is 100% temporal relation determined based on historical data, then value of the temporal relation may be '1', In addition, initially, the temporal relation may be computed based on the relation considering distance of the network segment and location of the application instance and time taken for the fault to manifest itself on the performance of the application considering packet sizes, protocols, and transmission delays into account. Further, the ALT-FACTOR, i.e., alternative path factor, may have a value ranging between 0.1 and 1. The ALT-FACTOR may be determined based on availability of active alternative paths (=>0.1), passive alternative paths (0.5), or no alternative paths (1.0). The LOC-FACTOR may be a location factor. The LOC_FACTOR may be determined based on the match between location of the network segment and the location of users experiencing the application performance degradation.

Figure 6:
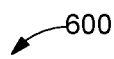
FIG. 6 illustrates a table depicting network segment fault contributing to application performance degradation, in accordance with an embodiment.

By way of an example, when an access network segment had a fault and it matches with the location of users accessing the application who experienced the performance degradation, then the LOC-FACTOR may be 1. However, when the users across locations experienced the performance degradation in the application, then the LOC-FACTOR could be 0.5. Moreover, value of the ADJ-FACTOR may range between 0.1 and 1 based on self-learning.). In an embodiment, the NET-SEG-FAULT-CONTRIB-APPL-ISSUE may be periodically recorded as depicted via a table 600 represented in FIG. 6. In table 600, a first column, i.e., network segment details 602 may depict details of each of the network segments that may be responsible for the performance degradation of an application running on it due to the fault that occurred in the network segment. A second column, i.e., fault details 604 may contain details of the (network segment) faults detected. A third column, i.e., impacted application instance(s) 606 may provide details of the application instance(s) that experienced the performance degradation due to the fault that occurred in the network segment. A fourth column, i.e., contribution level 608 may depict contribution of the fault that occurred in the network segment on the performance degradation in the application (or outage of the application).

Further, for each of the network services present in the NTW-SERV-IMP-LIST, mapping of each of the network services with any of the applications listed in the APP-FAULT-PERF-DEGRADATION-LIST may be determined. Further, based on the determined mapping, the table 700 represented in FIG. 7 may be prepared. In the table 700, a first column, i.e., network service details 702 may list the network services present in NTW-SERV-IMP-LIST. A second column, i.e., network service fault and/or performance issue 704 may provide details of the fault and/or performance issue(s) (if any) in the specific network service. A third column, i.e., application details 706 may depict details of the application served by the specific network service. A fourth column, i.e., contribution level 708, i.e., NTW-SERV-APPL-IMP-CONTRIB may depict the impact of the network service contributing to the application performance degradation. This has been further explained in conjunction to FIG. 8.

In order to adjust the NTW-SERV-APPL-IMP-CONTRIB, for each network service entry depicted via the network service details 702, a correlation of the fault and/or performance issues may be determined in that network service with each of the application instance(s) mapped to that network service. In an embodiment, the correlation may be determined based on well-known techniques described in prior-art taking into consideration the temporal relation of impact, overlap between the coverage area of the network service and the location of application and users accessing the application (higher overlap=> higher correlation), whether the network service is mapped to more than 1 application's instance(s) and whether all those applications are affected or not (if all applications mapped to that network service are impacted adversely then there is a high correlation), etc. Further, the NTW-SERV-APPL-IMP-CONTRIB thus determined may be adjusted based on the ADI-FACTOR based on the determined correlation. Moreover, the NTW-SERV-APPL-IMP-CONTRIB may also be adjusted in case the application is served by more than one network service based on the location of the network service (i.e., geographical coverage area) and the location of the users experiencing the fault and/or performance issue associated with the application. By way of an example, in one embodiment, complete overlap in the network service's coverage and the location of users experiencing application the fault and/or performance issue may imply the ADJ_FACTOR of 1. Moreover, in another embodiment, no overlap in the network service's coverage and the location of users experiencing application the fault and/or performance issue may imply the ADJ_FACTOR of 0.5. Further, the adjusted NTW-SERV-APPL-IMP-CONTRIB for each of the network services present in the table 700 may be updated as depicted via a column 808 of a table 800 represented in FIG. 8. In an embodiment, the column 808 depicting the updated NET-SERV-APPL-IMP-CONTRIB may be updated based on adjustments done as described above. Note that other columns, such as network service details 802, network service fault/performance issue 804, and application details 806 of FIG. 8 have entries same as network service details 702, network service fault/performance issue 704, and application details 706 of FIG. 7.

In an embodiment, for each application present in the APP-FAULT-PERF-DEGRADATION-LIST which are served by more than 1 network service following may be done, i.e., for each of the network services that are not in the NTW-SERV-IMP-LIST, the temporal correlation (also referred as the temporal relation) may be determined between any momentary deterioration in performance or short-lived faults (such that the SLA/KPI of the network service is not impacted), In addition to the temporal correlation, the fault and/or performance issue of the application for time stamps that are not overlapping with the fault and/or performance issues of the network services that are part of the NTW-SERV-IMP-LIST may be determined.

The table 800 may then be updated with new entries of the NTW-SERV-APPL-IMP-CONTRIB for those network service(s) whose correlation is higher than the provisioned threshold. This may be done to address scenario where the underlying network services are within their KPIs/SLAs, but the application as a whole may not be performing well. It may be noted that, the details of the application instance(s) to which the network segment fault and/or performance issue and network service issue contribute may be captured in the table 500, the table 600, and the table 800. The NET-AN-COG-SS 210 may then provide details of the table 500, the table 600, and the table 800 to the APP-NET-PERF-CORR-SS 204.

In an embodiment, determination of the network domain(s) and the network service(s) attributing to the application performance degradation is disclosed. The APP-NET-PERF-CORR-SS 204 may fetch the details from the table 500 about the network segments whose contribution levels may be greater than the predefined threshold and arrange them in descending order (starting with the network segment with highest contribution level) in an actionable network segment list, i.e., ACTIONABLE-NET-SEG-LIST. The APP-NET-PERF-CORR-SS 204 may then fetch the details about contribution level of the network services on the application whose contribution level may be greater than the pre-defined threshold (i.e., NTW-SERV-CONTRIB-THRESHOLD) from the table 800. Further, the network services may be arranged in descending order (starting with the network service with highest contribution level) in an actionable network service list, i.e., ACTIONABLE-NTW-SERV-LIST. Further, entries of the network segment and the network services present in the ACTIONABLE-NET-SEG-LIST and the ACTIONABLE-NTW-SERV-LIST, respectively, may be thus identified to be primary cause(s) of the application performance degradation and faults.

At step 408, the underlying network problem(s) may be determined. The APP-NET-PERF-CORR-SS 204 may move entries of the network segments in the ACTIONABLE-NET-SEG-LIST which are serving the network services in the ACTIONABLE-NTW-SERV-LIST to a priority-1 action network segment list, i.e., PRIO-1-ACTION-NET-SEG-LIST. In addition, the APP-NET-PERF-CORR-SS 204 may retain remaining entries of the network segment which are not serving the network services in the ACTIONABLE-NET-SEG-LIST. Once the entries of the network segments serving the network services are moved to the PRIO-1_ACTION-NET-SEG-LIST, then, the APP-NET-PERF-CORR-SS 204 may analyze each entry present in the PRIO-1-ACTION-NET-SEG-LIST. Firstly, the APP-NET-PERF-CORR-SS 204 may trigger the NET-AN-COG-SS 210 to analyze the fault and/or performance data of constituents (i.e., network functions and connections) in that network segment. Upon identifying the fault and/or performance issue in one or more constituents corresponding (correlating) to the fault and/or performance issue in the network segment, a record list, i.e., RC-LIST may be updated with details of the fault and/or performance issue in the constituent, possible reasons, and association to the entry in the PRIO-1-ACTION-NET-SEG-LIST.

In an embodiment, the fault and/or performance issues in the constituents may include hardware (processor, memory outage, antenna misaligned, cable cut), software (software hang, queue overflow, VM down, restart), etc. Further, more than one level of analysis may be required to pin-point exact reason or cause of the fault and/or performance issue, for example, start at the Network Function level, then go to infrastructure level, consider environmental factors (e.g., flood, cyclone, surge in voltage, etc.), any configuration changes done during specified time interval (manual as well as automated) including creation/deletion/modification of the network services and the network slices, change in network load (e.g., a high number of users suddenly came online), an emergency situation resulting in a flood of auto-triggered sensor alarms, as well as any security exceptions encountered during the specified interval (for e.g., a Denial of Service attack).

In an embodiment starting with analysis of a first entry of the network service in the ACTIONABLE-NTW-SERV-LIST, the APP-NET-PERF-CORR-SS 204 may perform following actions for each entry of the network service present in the ACTIONABLE-NTW-SERV-LIST. In order to perform analysis, initially, the APP-NET-PERF-CORR-SS 204 may trigger the NET-AN-COG-SS 210 to analyze the fault and/or performance data of the network service to identify root cause(s), taking into consideration potential issues in constituents (i.e., network slice instance hosting the network service, network functions and connections, hardware and software resources, and so on) serving the network service, other factors such as, configurations done to the network or the network service, creation/deletion/modification of other network services and slices, re-mapping of the network service to another slice, sharing the slice hosting the network service with another new service, higher rate of incoming traffic, for e.g., a bunch of users moving into a coverage area, security exceptions, etc. In order to identify the root cause, well-known existing techniques may be used, such as machine learning-based approaches as described in prior art. The identified root causes may then be updated in the RC-LIST with details of the fault and/or performance issue, possible reasons, and the association to the entry in the ACTIONABLE-NTW-SERV-LIST.

At step 410, resolution action(s) may be determined. In an embodiment, for each entry in the RC-LIST, the possible resolution actions may be based on historical data and adapted rules (i.e., the provisioned rules which have subsequently been adopted as described in Step 416). In an embodiment, the possible resolution actions determined for each entry of the RC-LIST may be represented as depicted via a table 900 of FIG. 9. In the table 900, a first column, i.e., cause(s) 902 may depict reason for occurrence of the fault and/or performance issue. Further, a second column, i.e., resolution action(s) 904 may depict the possible resolution action predicted for each of the fault and/or performance issues. In an embodiment, the APP-NET-PERF-CORR-SS 204 may remove duplicate the resolution actions determined and conflicting actions with help of the provisioned rules and policies. For example, when one resolution action specifies increase of bandwidth and another specifies decrease of bandwidth, then these two actions may be deemed contradictory. The APP-NET-PERF-CORR-SS 204 may then form a resolution action list, i.e., RES-ACTION- LIST with the resolution action(s) corresponding to each entry of the RC-LIST. Moreover, effectiveness (RES-EFF) of each of the resolution actions listed in the RES-ACTION-LIST to address the corresponding fault and/or performance issue present in the RC-LIST (based on historical data obtained from NET-AN-COG-SS 210) may also be included in the RES-ACTION-LIST.

Further, at step 412, the most appropriate resolution action (through impact analysis on other network segments/slices and applications) may be determined. In an embodiment, the APP-NET-PERF-CORR-SS 204 may determine the most appropriate resolution action from the RES-ACTION-LIST with help of the NET-AN-COG-SS 210. In order to determine the most appropriate resolution action, a feasibility check may be performed to determine feasibility of performing the resolution action, based on policy, user/service/application entitlements and other constraints provisioned by the operator.

Further, the resolution actions that do not meet specified criteria may be removed from the RES-ACTION-LIST. In addition, the impact of each of the resolution actions present in the RES-ACTION-LIST may be analyzed on other active applications, active network services, and active network slices. The impact may be analyzed with help of the NET-AN-COG-SS 210 based on historical data of the impact(s) caused by performing the resolution actions and currently active applications, active network services, active network slices, and resources utilized by the active applications, network services, and network slices at that instant.

In an embodiment, the impact may be analyzed due to reasons like, scaling of a resource for a particular network service running on a shared network slice may adversely impact another network service running on same network slice, prioritizing of a specific application's traffic on a shared connection link may cause performance degradation (e.g., higher latency, buffer overflows, pauses in video, etc.) in another application using the same connection link, and other similar reasons. The impact on each network service, network slice, other active applications, or user class with a priority higher than the network service, network slice, or other active application (or user class accessing the application) may be listed in an impact list, i.e., IMPACT-LIST.

Further, the impact of each of the resolution actions listed in the RES-ACTION-LIST may be assessed on other network segments, and the IMPACT-LIST may be updated accordingly. Additionally, for each entry of the resolution action present in the IMPACT-LIST a feasibility and a complexity of effectively addressing the impact of the fault and/or performance issue may be assessed as an impact factor, i.e., IMP-FACTOR between '0.1' and '0.9', where '0.1' denotes high effectiveness and '0.9' denotes least effectiveness). Further, complexity of the resolution action may be measured through number of actions and chain effect, i.e., effect of addressing the impact on other network services, network segments, network slices, and applications, i.e., leading to a chain of impacts. For each resolution action, resolution impact, i.e., RES-IMPACT may be computed as a sum of IMP-FACTOR for each entry in the IMPACT-LIST for that resolution action. In addition, each of the resolution actions may be ranked starting with the resolution action with least value of via an equation (2)

$$\text{Rank} = \text{RES-IMPACT} * (1/\text{RES-EFF}) \qquad (2)$$

In equation (2) above RES-IMPACT may correspond to the impact of the resolution actions. Further, the RES-EFF may depict effectiveness of the resolution determined as explained in Step 410 above. The resolution actions in the RES-ACTION-LIST having a RES-IMPACT greater that a pre-defined threshold, i.e., resource impact threshold (RES-IMPACT-THRES) are then removed from RES-ACTION-LIST.

At step 414, the resolution action(s) may be implemented. In addition, further corrective/preventive action(s) may be performed based on monitoring of the resolution action(s), to address potential (adverse) impacts arising out of implementing the resolution action(s). In an embodiment, the APP-NET-PERF-CORR-SS 204 may trigger the E2E-NS-LCM-SS 212, or the NET-SA-HM-SS 202 as appropriate to implement first resolution action in the RES-ACTION-LIST corresponding to each entry in the RC-LIST. Based on the impact assessment done in Step 412, the APP-NET-PERF-CORR-SS 204 may initiate actions to address the impacts of implementing the resolution action. The APP-NET-PERF-CORR-SS 204 may then trigger the NET-APP-PERF-FAULT-DATA-COLLECTION-SS 216 to continue monitoring and report specific details about the network service(s), slice(s), and network segment(s). The monitoring of the specific details may include requesting a more fine-grained reporting of the performance data that are related to the resolution action being carried out and the fault and/or performance issue being addressed. After a pre-defined interval, in one embodiment, when the resolution action performed might be successful as reflected in the fault and/or performance data reported from the AMS and from the network, the APP-NET-PERF-CORR-SS 204 may instruct the NET-APP-PERF-FAULT-DATA-COLLECTION-SS 216 to revert to its earlier state with respect to data collection and reporting.

In another embodiment, when the resolution action might not be successfully implemented (for reasons like, no resources available, connection failure, exception, etc.), then the APP-NET-PERF-CORR-SS 204 may trigger the implementation of next resolution action in the RES-ACTION-LIST corresponding to the specific entry in the RC-LIST. Moreover, when the impact may not be effectively addressed, the APP-NET-PERF-CORR-SS 204 may decide to reverse the resolution action (and any associated impact-related actions), and then trigger the implementation of the next resolution action in the RES-ACTION-LIST corresponding to specific entry in the RC-LIST. Alternatively, APP-NET-PERF-CORR-SS 204 may determine other corrective/preventive actions to effectively address the impacts with help of the NET-AN-COG-SS 210.

Moreover, if the resolution did not result in effectively addressing the fault and/or performance issue in the RC-LIST, and more importantly, the performance of the applications in the APP-FAULT-PERF-DEGRADATION-LIST (e.g., the improvement was below a provisioned threshold), the APP-NET-PERF-CORR-SS 204 may trigger the implementation of the next resolution action in the RES-ACTION-LIST corresponding to the specific entry in the RC-LIST until the fault and/or performance issues are successfully resolved. Moreover, if after carrying out all the resolution actions, the fault and/or performance issues in the RC-LIST and the applications in the APP-FAULT-PERF-DEGRADATION-LIST were not effectively addressed, then the APP-NET-PERF-CORR-SS 204 may repeat steps starting from the step 408 for all remaining entries in the ACTIONABLE-NET-SEG-LIST. Further, when the fault and/or performance issues are still not resolved, the APP-NET-PERF-CORR-SS 204 may increase the RES-IMPACT-THRES to identify potential alternative resolution actions and initiate their implementation. Further, if the problem is still not resolved, the APP-NET-PERF-CORR-SS 204 may request the NET-AN-COG-SS 210 to use more sophisticated (which may be more time-consuming and resource-intensive) techniques to try and identify the fault and/or performance issues and may then try to address them. Further, if none of above-described techniques are successful in addressing the determined fault and/or performance issue or result in unacceptable levels of the impacts to other network services and application instance(s), then the APP-NET-PERF-CORR-SS 204 may send a notification to the AMS with the relevant details.

Further, at step 416, the at least one of rules, parameters, and thresholds may be self-adapted for future operations. The APP-NET-PERF-CORR-SS 204 may assess effectiveness of the correlation, root cause analysis, resolution actions, etc., and auto-tune rules, parameters, and thresholds for improved future operation. In order to assess the effectiveness, the APP-NET-PERF-CORR-SS 204 may store details of the effectiveness of each resolution action, and any new impacts (not determined earlier) that arise due to implementation of the resolution action(s), stability of the resolution action (i.e., if the same problem reoccurred after a time interval), etc.

By way of an example, the APP-NET-PERF-CORR-SS 204 may access the effectiveness of process of determining and resolving network issues impacting application performance, such as, when the resolution action effectively addresses the network segment fault and/or performance issue, but the associated application performance did not improve, then the correlation of the ADJ-FACTOR may be lowered proportionately to the level of performance degradation observed after the resolution action was implemented and averaged over last 'n' cycles of operation. Further, the RES-EFF may have to be adapted based on whether the resolution action effectively addressed the fault and/or performance issue. Further, the NET-SEG-CONTRIB-THRESHOLD and the NTW-SERV-CONTRIB-THRESHOLD may have to be adjusted (increased or decreased) based on number of network segments and network services that encounters the fault and/or performance issues whose impacts were lower than the NET-SEG-CONTRIB-THRESHOLD and the NTW-SERV-CONTRIB-THRESHOLD respectively and had to be resolved for improvement in the application performance beyond a pre-defined threshold value. Moreover, when the resolution action resulted in new impacts (i.e., not predicted by the NET-AN-COG-SS 210), then the new impacts may be fed as input back to the NET-AN-COG-SS 210. Further, when the resolution action having the impact lower than the RES-IMPACT-THRES resulted in adverse side-effects and/or took a long time to reach a stable state, then the RES-IMPACT-THRES may have to be lowered. Similarly, if during the last 'n' cycles of operation, the APP-NET-PERF-CORR-SS 204 had to temporarily increase the RES-IMPACT-THRES to determine the most appropriate resolution action(s), the RES-IMPACT-THRES may have to be increased (say, by a pre-defined step of 10%). Further, the APP-NET-PERF-CORR-SS 204 may trigger the NET-AN-COG-SS 210 to analyze the effectiveness of identification of the root causes by examining how the actual problem finally got resolved and the associated fault and/or performance issue. The NET-AN-COG-SS 204 may perform the correlation of the resolution action of underlying causes with observed symptoms taking into account active network services, applications, etc. and determines if the underlying causes that were determined in Step 3 were effective, or if it requires adaptations based on subsequent resolution action triggered by the APP-NET-PERF-CORR-SS 204 and analyzing the fault and/or performance data collected from the network and the applications by the NET-APP-PERF-FAULT-DATA-COLLECTION-SS 216.

Further, the APP-NET-PERF-CORR-SS 204 may auto-tune rules, parameters, and thresholds for which changes were identified as described above, subject to policy constraints. Based on the details of the new impacts of the resolution action (for specific fault and/or performance issue) reported by the APP-NET-PERF-CORR-SS 204 to the NET-AN-COG-SS 210, the NET-AN-COG-SS 210 may update the impact list for that resolution action (and will validate it in future cycles), and/or update resolution action table (i.e., ADAPT-RES-ACTIONS-TABLE) as appropriate (for validated cases) for the corresponding fault and/or performance issue, if the resolution action may have to be done always or on meeting certain criteria. In an embodiment, the NET-AN-COG-SS 210 may also adopt the RES-EFF based on whether the resolution action had successfully resolved the fault and/or performance issue e.g., incremented or decremented as appropriate (based on success or failure) by a pre-defined %, say 5%. Further, the NET-AN-COG-SS 210 may adapt possible underlying causes for a given pattern of the fault and/or performance issue in the network segment or the network service and other factors such as services that are active, resource occupancy levels, etc. based on the analysis done in the assessment of the effectiveness.

Figure 10:
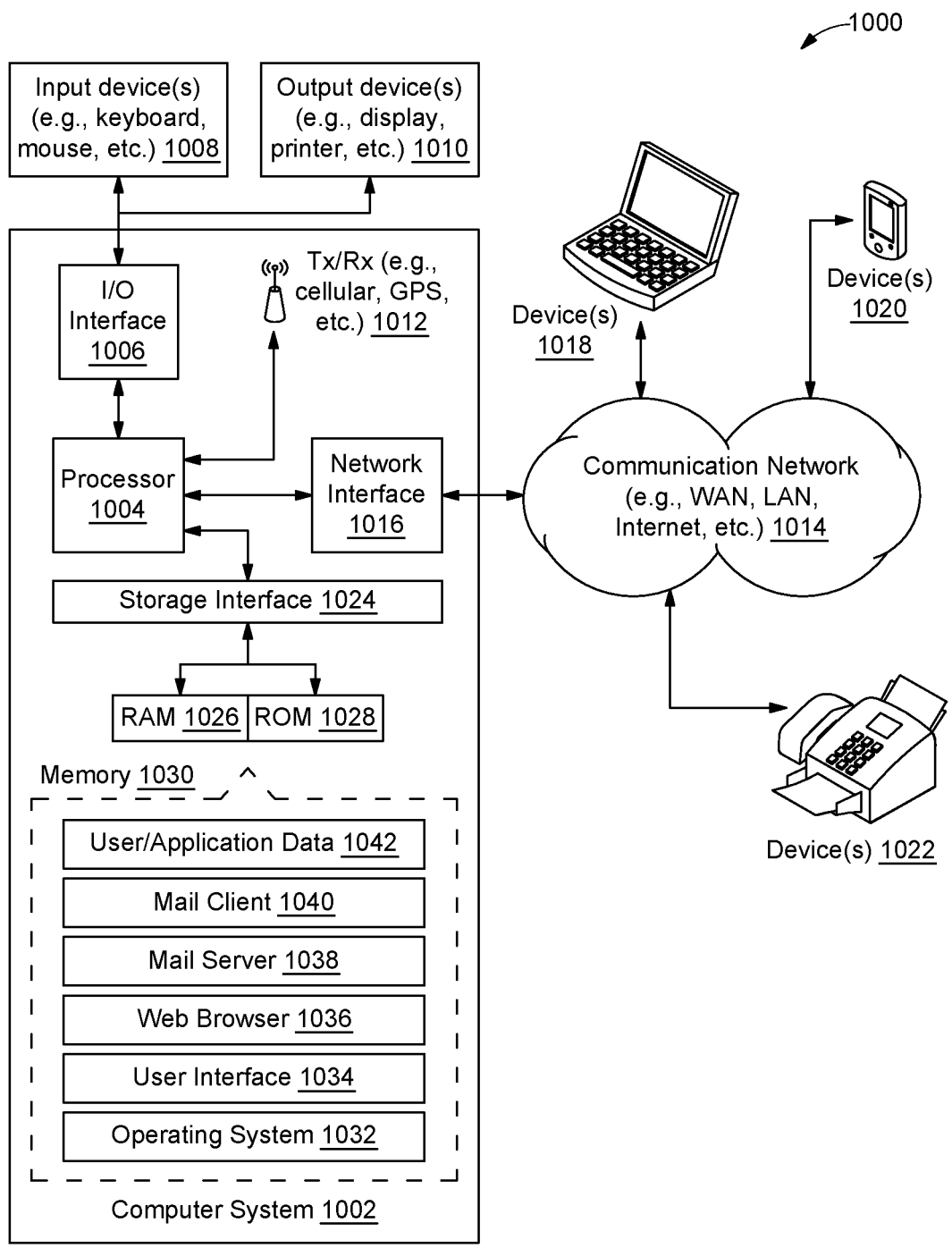
FIG. 10 illustrates a block diagram of an exemplary computer system for implementing embodiments consistent with the present disclosure.

Referring now to FIG. 10, a block diagram of an exemplary computer system 1002 for implementing various embodiments is illustrated. Computer system 1002 may include a central processing unit ("CPU" or "processor") 1004. Processor 1004 may include at least one data processor for executing program components for executing user or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD® ATHLOM® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1010 may be a printer, fax machine, video display (for example, cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (for example, TEXAS® INSTRUMENTS WILINK WL12866 transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (for example, using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1002 may itself embody one or more of these devices.

In some embodiments, processor 1004 may be disposed in communication with one or more memory devices (for example, RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of program or database components, including, without limitation, an operating system 1032, user interface application 1034, web browser 1036, mail server 1038, mail client 1040, user/application data 1042 (for example, any data variables or data records discussed in this disclosure), etc. Operating system 1032 may facilitate resource management and operation of computer system 1002. Examples of operating systems 1032 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1002 may implement a mail server 1038 stored program component. Mail server 1038 may be an Internet mail server such as MICROSOFT® EXCHANGE® mail server, or the like. Mail server 1038 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such databases may be implemented as fault-tolerant, relational, scalable secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for determining and resolving network issues impacting application performance in multi-domain networks. The method and system may first obtain at least one of health and performance data associated with an application and one or more alerts related to fault and/or performance issues associated with the application. The health and performance data may be analyzed to obtain insights into application performance. The method and system may then determine at least one of network faults and performance issues that influence at least one of fault and/or performance issues associated with the application. Further, the method and system may determine one or more underlying network problems that impact performance of the application based on the at least one of the network faults and performance issues. Moreover, the method and the system may determine at least one appropriate resolution action to address the one or more underlying network problems. Additionally, the method and the system may implement the at least one appropriate resolution action to improve the application performance. The implementation of the at least one appropriate resolution action on the network segments, the network slices and the network applications of the other networks may be monitored. Thereafter, the method and the system may adapt at least one of rules, parameters, and thresholds, based on an effectiveness factor determined for the at least one appropriate resolution action implemented.

The specification has described method and system for determining and resolving network issues impacting application performance in multi-domain networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determining and resolving network issues impacting application performance in multi-domain networks, the method comprising:
   obtaining, by a Multi-Domain Orchestrator (MDO), at least one of health and performance data associated with an application and at least one alert related to fault and performance issues associated with the application, wherein the at least one of health and performance data is analyzed to obtain insights into application performance;
   determining, by the MDO, at least one of network faults and performance issues that influence at least one of fault and performance issues associated with the application;
   determining, by the MDO, one or more underlying network problems that impact performance of the application based on the at least one of network faults and performance issues;
   determining, by the MDO, at least one appropriate resolution action to address the one or more underlying network problems by:
      selecting the at least one appropriate resolution action for each of the one or more underlying network problems, and wherein the selection of the at least one appropriate resolution action comprises:
         examining an execution feasibility of the one or more resolution actions based on a predefined policy, user entitlements, service entitlements and application entitlements;
         assessing an impact of the one or more resolution actions on the application performance, the network services, the network slices and the network segments;
         assigning a feasibility and complexity score to the one or more resolution actions, based on the assessed impact of the one or more resolution actions;
         ranking and arranging the one or more resolution actions in an ascending order, based on the assigned feasibility and complexity score; and
         discarding the one or more resolution actions having the feasibility and complexity score greater than a predefined threshold score;

implementing, by the MDO, the at least one appropriate resolution action to improve the application performance;

monitoring, by the MDO, an effectiveness of the implementation of the at least one appropriate resolution action on network segments, network services and network services slices on improving the application performance, and impact of the resolution action on other network segments, network services, network slices and applications and taking appropriate preventive and corrective actions based on the monitoring; and adapting, by the MDO, at least one of rules, parameters, and thresholds, based on an effectiveness factor determined for the at least one appropriate resolution action implemented.

2. The method of claim 1, wherein the health and performance data comprise determination of at least one of interaction latencies between an application level client and a server, response time from a server side application instance to a client, the application performance across deployed application instances, Central Processing Unit (CPU) utilization levels and number of concurrent sessions data for each of the deployed application instances.

3. The method of claim 1, wherein the analysis of the health and performance data comprises:
determining a count of application instances experiencing performance degradation; and
determining consistency of the performance degradation for each of the count of the application instances.

4. The method of claim 1, wherein the at least one alert comprises information related to the application instances, a time window associated with the application, and location information associated with application client.

5. The method of claim 1, further comprising:
analyzing each of the one or more underlying network problems to determine network domains and network segments associated with an affected application instance, correlation of the one or more underlying network problems and the at least one fault and performance issues associated with the affected application instance, and determination of network domains and network services attributing to performance degradation of the affected application instance.

6. The method of claim 1, wherein the at least one appropriate resolution action comprises at least one of a resolution action for each of a corresponding network problem.

7. The method of claim 1, wherein for the determination of the at least one appropriate resolution action, the determined one or more resolution actions for improving the application performance are evaluated based on one or more of an effectiveness parameter, an impact parameter, and a stability parameter, and wherein the one or more resolution actions are determined based on an effectiveness of each of the one or more resolution actions to address the one or more underlying network problems, based on historical data and adapted rules.

8. The method of claim 1, wherein the one or more underlying network problems comprises at least one of hardware issues, software issues, configuration issues comprising creation, deletion and modification of network services and network slices, change in network load and security exceptions.

9. The method of claim 1, wherein adapting at least one of the rules, the parameters, and the thresholds comprises:

assessing effectiveness of the at least one appropriate resolution action, wherein assessing effectiveness comprises determining new impacts arising due to implementation of the at least one appropriate resolution action and stability of the at least one appropriate resolution action; and determining the effectiveness factor for the at least one appropriate resolution action based on the assessed effectiveness.

10. A system for determining and resolving network issues impacting application performance in multi-domain networks, the system comprising:
a processor; and
a memory communicatively coupled to the processor, wherein the memory stores processor instructions, which, on execution, causes the processor to:
obtain at least one of health and performance data associated with an application and at least one alert related to fault and performance issues associated with the application, wherein the at least one of health and performance data is analyzed to obtain insights into application performance;
determine at least one of network faults and performance issues that influence at least one of fault and performance issues associated with the application;
determine one or more underlying network problems that impact performance of the application based on the at least one of network faults and performance issues;
determine at least one appropriate resolution action to address the one or more underlying network problems by:
selecting at least one appropriate resolution action for each of the one or more underlying network problems, wherein, to select the at least one appropriate resolution action, the processor executable instructions further cause the processor to:
examine an execution feasibility of the one or more resolution actions based on a predefined policy, user entitlements, service entitlements and application entitlements;
assess an impact of the one or more resolution actions on the application performance, the network services, the network slices and the network segments;
assign a feasibility and complexity score to the one or more resolution actions, based on the assessed impact of the one or more resolution actions;
rank and arrange the one or more resolution actions in an ascending order, based on the assigned feasibility and complexity score; and
discard the one or more resolution actions having the feasibility and complexity score greater than a predefined threshold score;
implement the at least one appropriate resolution action to improve the application performance;
monitor an implementation of the at least one appropriate resolution action on network segments, network services and network services slices on improving the application performance, and impact of the resolution action on other network segments, network services, network slices and applications and taking appropriate preventive and corrective actions actions based on the monitoring; and
adapt at least one of rules, parameters, and thresholds, based on an effectiveness factor determined for the at least one appropriate resolution action implemented.

11. The system of claim 10, wherein the health and performance data comprise determination of at least one of interaction latencies between an application level client and a server, response time from a server side application instance to a client, the application performance across deployed application instances, Central Processing Unit (CPU) utilization levels and number of concurrent sessions data for each of the deployed application instances.

12. The system of claim 10, wherein the analysis of the health and performance data comprises:
   determining a count of application instances experiencing performance degradation; and
   determining consistency of the performance degradation for each of the count of the application instances.

13. The system of claim 10, wherein the at least one alert comprises information related to the application instances, a time window associated with the application, and location information associated with application client.

14. The system of claim 10, wherein the processor executable instructions further cause the processor to:
   analyze the one or more underlying problems to determine network domains and network segments associated with an affected application instance, correlation of the underlying network faults and the at least one fault and performance issues associated with the affected application instance, and determination of network domains and network services attributing to performance degradation of the affected application instance, and wherein the one or more underlying network problems comprises at least one of hardware issues, software issues, configuration issues comprising creation, deletion and modification of network services and network slices, change in network load and security exceptions.

15. The system of claim 10, wherein the at least one appropriate resolution action comprises at least one of a resolution action for each of a corresponding network problem.

16. The system of claim 10, wherein for the determination of the at least one appropriate resolution action, the determined one or more resolution actions for improving the application performance are evaluated based on one or more of an effectiveness parameter, an impact parameter, and a stability parameter, and wherein the one or more resolution actions are determined based on an effectiveness of each of the one or more resolution actions to address the one or more underlying network problems, based on historical data and adapted rules.

17. The system of claim 10, wherein to adapt at least one of the rules, the parameters, and the thresholds, the processor executable instruction further causes the processor to:
   assess effectiveness of the at least one appropriate resolution action, wherein assessing effectiveness comprises determining new impacts arising due to implementation of the at least one appropriate resolution action and stability of the at least one appropriate resolution action; and
   determine the effectiveness factor for the at least one appropriate resolution action based on the assessed effectiveness.

18. A non-transitory computer-readable storage medium for determining and resolving network issues impacting application performance in multi-domain networks, having stored thereon, a set of computer-executable instructions causing a computer comprising one or more processors to perform steps comprising:
   obtaining at least one of health and performance data associated with an application and at least one alert related to fault and performance issues associated with the application, wherein the at least one of health and performance data is analyzed to obtain insights into application performance;
   determining at least one of network faults and performance issues that influence at least one of fault and performance issues associated with the application;
   determining one or more underlying network problems that impact performance of the application based on the at least one of network faults and the performance issues;
   determining at least one appropriate resolution action to address the one or more underlying network problems by
      selecting the at least one appropriate resolution action for each of the one or more underlying network problems, and wherein the selection of the at least one appropriate resolution action comprises:
         examining an execution feasibility of the one or more resolution actions based on a predefined policy, user entitlements, service entitlements and application entitlements;
         assessing an impact of the one or more resolution actions on the application performance, the network services, the network slices and the network segments;
         assigning a feasibility and complexity score to the one or more resolution actions, based on the assessed impact of the one or more resolution actions;
         ranking and arranging the one or more resolution actions in an ascending order, based on the assigned feasibility and complexity score; and
         discarding the one or more resolution actions having the feasibility and complexity score greater than a predefined threshold score;
   implementing the at least one appropriate resolution action to improve the application performance;
   monitoring an effectiveness of the implementation of the at least one appropriate resolution action on network segments, network services and network services slices on improving the application performance, and impact of the resolution action on other network segments, network services, network slices and applications and taking appropriate preventive and corrective actions based on the monitoring; and
   adapting at least one of rules, parameters, and thresholds, based on an effectiveness factor determined for the at least one appropriate resolution action implemented.

* * * * *